United States Patent [19]

Plum et al.

[11] Patent Number: 4,906,692

[45] Date of Patent: Mar. 6, 1990

[54] SELF-CROSSLINKING CATIONIC PAINT BINDERS AND PROCESS FOR PRODUCING THE BINDERS

[75] Inventors: Helmut Plum, Taunusstein, Fed. Rep. of Germany; Michael Hönel, Graz, Austria

[73] Assignee: Vianova Kunstharz, A.G., Werndorf, Austria

[21] Appl. No.: 346,703

[22] Filed: May 3, 1989

Related U.S. Application Data

[63] Continuation of Ser. No. 910,965, Sept. 24, 1986, abandoned.

[30] Foreign Application Priority Data

Sep. 25, 1985 [AT] Austria .................................. 2787/85

[51] Int. Cl.[4] .................................................. C08F 8/30
[52] U.S. Cl. ...................................... 525/127; 524/507; 524/533; 524/590; 524/591; 525/328.2; 525/328.8; 525/374; 525/420; 525/424
[58] Field of Search .................. 525/127, 328.2, 328.8, 525/374, 420, 424

[56] References Cited

U.S. PATENT DOCUMENTS

| | | | |
|---|---|---|---|
| 4,016,120 | 4/1977 | Matsuda et al. | 524/591 |
| 4,036,795 | 7/1977 | Tominaga | 524/590 |
| 4,252,699 | 2/1981 | Tsuchiya et al. | 524/594 |
| 4,285,789 | 8/1981 | Kobayashi et al. | 204/181.7 |
| 4,364,860 | 12/1982 | Pataschke et al. | 525/127 |
| 4,373,059 | 2/1983 | Patzschke et al. | 525/127 |
| 4,373,072 | 2/1983 | Pataschke et al. | 525/127 |
| 4,495,335 | 1/1985 | Geist et al. | 525/127 |
| 4,547,409 | 10/1985 | Geist et al. | 525/127 |

*Primary Examiner*—Joseph L. Schofer
*Assistant Examiner*—Bernard Lipman
*Attorney, Agent, or Firm*—A. W. Breiner

[57] ABSTRACT

Self-crosslinking cationic paint binders in which the crosslinking is effected through the reaction of methane-carboxylic acid dialkylester monoamide structures with free hydroxyl or amino groups on the resin are described. The crosslinking functionality is provided by reaction of a polyisocyanate with a corresponding quantity of a CH-active alkyl ester. The alkyl ester is preferably a malonic acid dimethylester or malonic acid diethylester.

8 Claims, No Drawings

SELF-CROSSLINKING CATIONIC PAINT BINDERS AND PROCESS FOR PRODUCING THE BINDERS

This is continuation of application Ser. No. 06/910,965 filed Sept. 24, 1986 now abandoned.

FIELD OF INVENTION

The present invention is directed to self-crosslinking cationic paint binders and to a process for producing the binders. More particularly, self-crosslinking cationic paint binders are provided wherein the crosslinking is effected through the reaction of methane carboxylic acid alkylester monoamide structures with free hydroxyl or amino groups on the binder resin.

BACKGROUND OF INVENTION

It is known according to Petersen, Taube; Liebigs Ann. Chem. 562, (1949) 205, that compounds can be made which carry a methanetricarboxylic acid dialkylester monoamide structure from isocyanates and malonic acid dialkylesters in the presence of sodium or sodium alcoholates as a catalyst. These compounds react at temperatures of from about 130° C. and upwards with polyols. The aforesaid reaction has been utilized in the preparation of hardening components for liquid stoving paints or stoving paints in organic solvents. Products of this type are described, for example, in DE-OSS 23 43 603; DE-OSS 24 36 877, and DE-OSS 25 50 156. The isocyanate-malonate addition products, in principle, can also be used in compositions for cathodic electrodeposition, if they are combined with basic synthetic resins which are water dilutable on partial neutralization with acids. However, at low stoving temperatures, i.e., temperatures of about 140° C., coatings are obtained with unsatisfactory hardness and solvent resistance. The co-employment of aminoplast resins with the aforesaid systems has been described in DE-OS 27 23 117, but this expediency does not provide the necessary hardness and solvent resistance. It is assumed that catalysts, such as the sulfonic acids, which are necessary for hardening the aminoplast resins are neutralized by the basic resins and thus become ineffective.

SUMMARY AND GENERAL DESCRIPTION OF INVENTION

It has now been found that self-crosslinking cationic paint binders can be obtained which give coatings with excellent paint performance at stoving temperatures of from about 120° C. and upwards, if methane carboxylic acid mono- and/or dialkyester monoamide structures are introduced into the binders carrying basic groups through monoisocyanate compounds. The products are water dilutable upon partial or complete protonation and are suitable as a one-component system, particularly as the binder for electrodeposition paints.

The present invention is, therefore, concerned with self-crosslinking cationic paint binders and with a process for producing such self-crosslinking cationic paint binders which are water dilutable upon partial or complete protonation with inorganic and/or organic acids, characterized in that a polycondensation, polyaddition, or other polymerization resin carrying basic nitrogen groups and hydroxy groups and/or amino groups capable of transesterification or transamidation and isocyanate-reactive hydrogen atoms is reacted with a compound carrying at least one methane carboxylic acid mono- and/or dialkylestermonoamide group of the formula—

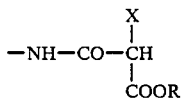

wherein
X is —COOR, —CN or $CH_3$—CO—, and
R is an alkyl radical with from 1 to 8 C-atoms.

The invention further includes the use of the products produced according to this invention as binders for cathodically depositable electrodeposition paints.

In the crosslinking reaction of the products of this invention, which is a transesterification or transamidation reaction, the only product split off is the alcohol of the CH-active alkyl ester. There is no evidence that the splitting off of the alcohol of the CH-active ester is accompanied by the setting free of isocyanate groups and subsequent crosslinking with the formation of urethane and urea groups. This reaction mechanism is known from recent investigations with malonic acid diethylester/cyclohexyldiisocyanate addition products as disclosed in Wicks, Kostyk; J. Coat.Techn. 49, (1977) 77.

Suitable polycondensation, polyaddition or other polymerization resins suitable for use according to this invention are cationic resins which have been described in the literature and are commercially available. The condition for their suitability is that they contain (a) a sufficient number of basic groups, preferably tertiary amino groups to give appropriate dilutability with water, optionally in the presence of auxiliary solvents; (b) a sufficient number of isocyanatereactive hydrogen atoms to provide reaction sites for reaction with isocyanates; and (c) a sufficient number of free hydroxyl and amino groups disposable for the transesterification and transamidation to provide the essential self-crosslinking. Examples of suitable components are polymers of olefinically unsaturated monomers containing as an ingredient, esters of olefinically unsaturated carboxylic acids and hydroxyalkylacrylates or aminoalkylacrylates. Another group is the polyaminopolyamides obtained from dimerized fatty acids and polyamines or the aminopolyetherpolyols obtained through reaction of epoxy resins with primary and secondary amines. The above-noted aminopolyetherpolyols are particularly suited for the formulation of cathodically depositable electrodeposition compositions.

The crosslinking functionality is introduced through compounds which carry one free isocyanate group and at least one methanecarboxylic acid mono- and/or dialkylestermonoamide group. Such compounds are obtained through reaction of polyisocyanate compounds with the corresponding quantity of a CH-active alkyl ester. The polyisocyanate compounds employed are preferably the diisocyanates and particularly those having a different reactivity for the two isocyanate groups. Examples of such compounds are 3-isocyanatomethyl-3,5,5-trimethylcyclohexylisocyanate (IPDI) and 2,4-diisocyanato toluol.

Suitable CH-active esters are compounds of the general formula—

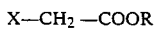

wherein X is —COOR, —CN or CH₃—CO—, and R is an alkyl radical with from 1 to 8 C-atoms. Preferred esters are the malonic acid dimethylester or malonic acid diethylester.

The reaction between the diisocyanate and the CH-active alkylester is preferably carried out in the presence of solvents which do not carry active hydrogen atoms, such as ethylacetate, butylacetate, toluol, methylethylketone, ethyleneglycoldimethylether, and the like. The reaction can also be effected without a solvent. Preferably the reaction is protected by a blanket of an inert gas such as nitrogen gas and with the preclusion of moisture. Sodium or preferably sodium phenolate catalyst, in a quantity of from about 0.1–0.5% by weight calculated on the total weight of the reaction blend are preferably utilized to accelerate the reaction. The polyisocyanate and CH-active alkylester are used in substantially equimolar quantities. The reaction is carried out in order that the isocyanate, optionally together with the solvent, is charged to the reaction vessel and the CH-active alkylester and the catalyst are added continuously within from about 30 minutes to 10 hours, preferably at room temperature. To preclude side reaction, the intermediate so obtained is directly reacted further at 40° to 60° C. with the cationic resin until the isocyanate content has fallen to practically zero. The number of ester groups available for crosslinking of the intermediate product should range between 0.5 to 2 per remaining hydroxy group or primary or secondary amino group in the final product.

The binders of the present invention can be formulated into paints using conventional methods and processed, particularly in the electrodeposition process using procedures known to one skilled in the art and as described in the literature. Moreover, to accelerate the transesterification and transamidation, the known catalysts, such as metal salts of organic acids, for example, zinc-, lead-, iron-, copper-, chromium-acetate, -octoate or -naphthenate, can be used.

PRESENTLY PREFERRED EMBODIMENTS

The following examples illustrate the invention without limiting its scope. Parts and percentages refer to parts and percentages by weight unless otherwise stated.

EXAMPLE 1

(a) Preparation Of A Polymer Carrying Basic Nitrogen And Hydroxy Groups

In a suitable reaction vessel, 1627 g (3.43 Val) of an epoxy resin based on the reaction of bisphenol A and epichlorohydrin having an epoxy equivalent weight of about 475 are reacted at 110° C. with a carboxy functional polyester prepared as described below in an 85% solution in diethyleneglycol dimethylether (DGME) to an acid value of below 0.5 mg KOH/g. After dilution of the batch with DGME solvent to a solids content of 70%, a blend of 94.5 g (0.9 Val) diethanolamine, 67.5 g (0.9 Val) N-methylethanolamine, 78 g (1.2 Val) N,N-diethylamino-propylamine, and 240 g DGME is added at 60° C. over a two-hour period. The reaction is continued at 70° C. to 90° C. until the theoretically calculated epoxy value is reached. After addition of 233 g polypropyleneglycol diglycidylether (molecular weight about 400), the reaction is continued at 120° C. until all the glycidyl groups have reacted. The solids content of the reaction product is adjusted to 70% with DGME.

Val as used herein means equivalent weight in grams for the designated functional group and, accordingly, is equivalent to groups.

The carboxy functional polyester used in this Example 1 is prepared through reaction of 3 moles trimethylolpropane, 2 moles adipic acid, 1 mole isononanoic acid, and 1 mole tetrahydrophthalic acid anhydride. The polyester has an acid value of 65 mg KOH/g and thus a carboxy equivalent weight of 942 g.

(b) Preparation Of The Monoisocyanate Compound

To a separate reaction vessel containing a 56% solution of 1 mole of isophorone diisocyanate in DGME, at a temperature of 30° C., 1 mole of malonic acid diethyl ester and 1% by weight of sodium phenolate as catalyst, are slowly added. Then, at 35 to 38° C., the reaction is continued to the theoretical NCO-value of the monoisocyanate compound.

(c) Preparation Of Paint Binder

The polymer solution of (a) above corresponding to 420 g resin solids, and 105 g (resin solids) of monoisocyanate compound of (b) above are reacted at a temperature of from 50° to 55° C. to an NCO-value of practically zero. The reaction product is neutralized with 12.6 g acetic acid (100%) and diluted to a solids content of 15% with deionized water. Cathodically deposited films, after curing at 130° C. for 20 minutes, have a resistance to methylethyl ketone of more than 100 double rubs.

EXAMPLE 2

In this example a polyamido amine is used as the polymer.

In a suitable reaction vessel equimolar quantities of an isomerized soya oil fatty acid methyl ester containing about 56% by weight of conjugated unsaturated components and styrene are cationically polymerized. Then, at 280° C., the volatile matter of the batch is distilled off under vacuum to provide a slightly yellowish oily reaction product. 1000 g of the reaction product is then reacted with 237 g diethylene triamine and 73 g N-methyldipropylene triamine. The methanol which is formed is distilled off. The obtained polyamidoamine has an acid value of 3 mg KOH/g and an amine value of about 250 mg KOH/g. 420 g of this polyamido amine resin are reacted with 217 g of the monoisocyanate compound (solution) prepared according to Example 1(b) at 20° to 60° C. to an NCO-value of zero.

The reaction product is blended with 20.5 g acetic acid (100%) and diluted with deionized water to a solids content of 15%. Cathodically deposited films of this solution, upon curing at 130° C. (object temperature), for 20 minutes have a resistance to methylethyl ketone of more than 100 double rubs.

EXAMPLE 3

Use of a basic nitrogen and hydroxy group containing polymer.

In a suitable reaction vessel, at 140° C., a blend of 135 g of a methacrylic acid-4-hydroxymethyl-1,3-dioxolane-2- on-ester, 60 g methylmethacrylate, 130 g 2-ethylhexylacrylate, 13.0 g di-tert.-butyl peroxide and 3.3 g dodecylmercaptan are added continuously within the course of seven hours to 230 g DGME. After completion of the addition, the reaction blend is held at 140° C. for another two hours. After cooling to 80° C., 74 g N,N-dimethylaminopropyl amine are added and reacted at 80° C. until the theoretically calculated amine value is reached. Then the solids content of the batch is adjusted with DGME to 60%. 700 g of the obtained copolymer solution are reacted at 50° C. with 197 g of the isocyanate compound prepared according to Example 1(b) to an NCO-value of practically zero. After neutralization with 16.6 g acetic acid (100%), the batch is diluted with deionized water to a solids content of 15%.

Cathodically deposited films, after curing at 130° C. for 20 minutes, object temperature, have a resistance to methylethyl ketone of more than 100 double rubs.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing self-crosslinking cationic paint binders water dilutable upon protonation with inorganic or organic acids, characterized in that a resin which is a polymer of the group consisting of polymers of olefinically unsaturated monomers containing as an ingredient esters of olefinically unsaturated carboxylic acid and hydroxyalkylacrylates or aminoalkylacrylates, of polyaminopolyamides and of aminopolyetherpolyols, carrying basic nitrogen groups and hydroxy or amino groups capable of transesterification or transamidation and isocyanate-reactive hydrogen atoms is reacted with a compound carrying at least one methanecarboxylic acid mono- or dialkylester monoamide group of the formula—

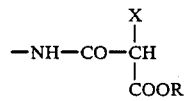

wherein
X is —COOR, —CN or CH₃—CO—, and
R is an alkyl radical with 1 to 8 C-atoms.

2. Process according to claim 1, further characterized in that the compound carrying at least one methane-carboxylic acid mono- or dialkylester monoamide group is the reaction product of a polyisocyanate compound with the corresponding quantity of a CH-active alkyl ester of the general formula—

X—CH₂—COOR wherein
X=—COOR, —CN or CH₃—CO—, and
R is an alkyl radical with from 1 to 8 C-atoms.

3. Process according to claim 2, further characterized in that the CH-active alkyl ester is a malonic acid dimethylester or a malonic acid diethylester.

4. A cathodically depositable electrodeposition paint comprising the paint binders produced according to the process of claim 1.

5. Self-crosslinking cationic paint binders water dilutable upon protonation with inorganic or organic acids comprising the reaction product of (a) a resin which is a polymer of the group consisting of polymers of olefinically unsaturated monomers containing as an ingredient esters of olefinically unsaturated carboxylic acid and hydroxyalkylacrylates or aminoalkylacrylates, of polyaminopolyamides and of aminopolyetherpolyols, carrying basic nitrogen groups and hydroxy or amino groups capable of transesterification or transamidation and isocyanate-reactive hydrogen atoms; and (b) a compound carrying at least one methanecarboxylic acid mono- or dialkylester monoamide group of the formula—

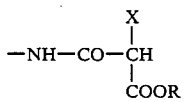

wherein
X is —COOR, —CN or CH₃—CO—, and
R is an alkyl radical with 1 to 8 C-atoms.

6. Paint binder according to claim 5, wherein the compound carrying at least one methanecarboxylic acid mono- or dialkylester monoamide group is the reaction product of a polyisocyanate compound with the corresponding quantity of a CH-active alkyl ester of the general formula—

X—CH₂—COOR wherein
X=—COOR, —CN or CH₃—CO—, and
R is an alkyl radical with from 1 to 8 C-atoms.

7. Paint binder according to claim 6, wherein the CH-active alkyl ester is a malonic acid dimethylester or a malonic acid diethylester.

8. A cathodically depositable electrodeposition paint comprising the paint binders of claim 5.

* * * * *